US006987855B1

(12) United States Patent
Srivastava

(10) Patent No.: US 6,987,855 B1
(45) Date of Patent: Jan. 17, 2006

(54) OPERATIONAL OPTIMIZATION OF A SHARED SECRET DIFFIE-HELLMAN KEY EXCHANGE AMONG BROADCAST OR MULTICAST GROUPS

(75) Inventor: Sunil K. Srivastava, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 10/715,932

(22) Filed: Nov. 17, 2003

Related U.S. Application Data

(63) Continuation of application No. 09/393,410, filed on Sep. 10, 1999, now abandoned.

(51) Int. Cl.
*H04L 9/00* (2006.01)

(52) U.S. Cl. .................. 380/278; 380/282; 380/284
(58) Field of Classification Search ............... 713/171, 713/178; 380/30, 278, 282, 284; 709/229
See application file for complete search history.

(56) References Cited

U.S. PATENT DOCUMENTS

| | | | |
|---|---|---|---|
| 4,200,770 A * | 4/1980 | Hellman et al. ............ 380/30 |
| 4,531,020 A | 7/1985 | Wechselberger et al. |
| 4,578,531 A * | 3/1986 | Everhart et al. ........... 380/282 |
| 4,776,011 A | 10/1988 | Busby |
| 4,881,263 A | 11/1989 | Herbison et al. |
| 5,309,516 A | 5/1994 | Takaragi et al. |
| 5,351,295 A | 9/1994 | Perlman et al. |
| 5,361,256 A | 11/1994 | Doeringer et al. |
| 5,588,060 A | 12/1996 | Aziz |
| 5,588,061 A | 12/1996 | Ganesan et al. |
| 5,600,642 A | 2/1997 | Pauwels et al. |
| 5,630,184 A | 5/1997 | Roper et al. |
| 5,633,933 A * | 5/1997 | Aziz ........................ 380/30 |
| 5,663,896 A | 9/1997 | Aucsmith |
| 5,724,425 A * | 3/1998 | Chang et al. ............... 705/52 |
| 5,748,736 A | 5/1998 | Mittra |
| 5,761,305 A * | 6/1998 | Vanstone et al. .......... 713/171 |
| 5,805,578 A | 9/1998 | Stirpe et al. |

(Continued)

FOREIGN PATENT DOCUMENTS

| EP | 0 952 718 A2 | 10/1999 |
|---|---|---|
| EP | 0 994 600 A2 | 4/2000 |

OTHER PUBLICATIONS

Alfred J. Menezes. Handbook of Applied Cryptography. 1997. CRC Press LLC. p. 519-520.*

(Continued)

*Primary Examiner*—Ayaz Sheikh
*Assistant Examiner*—Christian La Forgia
(74) *Attorney, Agent, or Firm*—Hickman Palermo Truong & Becker, LLP

(57) ABSTRACT

An optimized approach for arriving at a shared secret key in a multicast or broadcast group environment is disclosed. The key exchange method is mathematically equivalent to the standard broadcast version of the Diffie-Hellman public-key algorithm. However, from an implementation perspective, nodes within a multicast or broadcast group are treated in a binary fashion, whereby a shared secret key is generated for a pair of nodes at a time. Once the shared secret key is computed by the pair, the nodes within the pair are viewed as a single entity by a node that is to be joined. This process is iteratively performed until all the nodes within the multicast group attain a common shared secret key. Under this approach, the number of messages exchanged between the nodes for establishing the secured channel is significantly reduced compared to the standard broadcast Diffie-Hellman method.

30 Claims, 6 Drawing Sheets

U.S. PATENT DOCUMENTS

| | | | |
|---|---|---|---|
| 5,841,864 A * | 11/1998 | Klayman et al. | 713/171 |
| 5,850,451 A | 12/1998 | Sudia | |
| 5,889,865 A | 3/1999 | Vanstone et al. | |
| 5,920,630 A | 7/1999 | Wertheimer et al. | |
| 5,987,131 A | 11/1999 | Clapp | |
| 6,009,274 A | 12/1999 | Fletcher et al. | |
| 6,049,878 A | 4/2000 | Caronni et al. | |
| 6,055,575 A * | 4/2000 | Paulsen et al. | 709/229 |
| 6,088,336 A | 7/2000 | Tosey | |
| 6,119,228 A | 9/2000 | Angelo et al. | |
| 6,151,395 A | 11/2000 | Harkins | |
| 6,216,231 B1 | 4/2001 | Stubblebine | |
| 6,226,383 B1 * | 5/2001 | Jablon | 380/30 |
| 6,240,188 B1 | 5/2001 | Dondeti et al. | |
| 6,256,733 B1 | 7/2001 | Thakkar et al. | |
| 6,263,435 B1 | 7/2001 | Dondeti et al. | |
| 6,272,135 B1 | 8/2001 | Nakatsugawa | |
| 6,279,112 B1 | 8/2001 | O'Toole, Jr. et al. | |
| 6,295,361 B1 | 9/2001 | Kadansky et al. | |
| 6,330,671 B1 | 12/2001 | Aziz | |
| 6,332,163 B1 | 12/2001 | Bowman-Amuah | |
| 6,363,154 B1 * | 3/2002 | Peyravian et al. | 380/283 |
| 6,483,921 B1 | 11/2002 | Harkins | |
| 6,507,562 B1 | 1/2003 | Kadansky et al. | |
| 6,584,566 B1 | 6/2003 | Hardjono | |
| 6,633,579 B1 | 10/2003 | Tedijanto et al. | |
| 6,636,968 B1 * | 10/2003 | Rosner et al. | 713/178 |
| 6,643,773 B1 | 11/2003 | Hardjono | |
| 6,684,331 B1 | 1/2004 | Srivastava | |
| 6,745,243 B2 | 6/2004 | Squire et al. | |
| 6,785,809 B1 * | 8/2004 | Hardjono | 713/163 |

OTHER PUBLICATIONS

Bruce Schneier. Applied Cryptography. 1996. John Wiley & Sons, Inc. p. 33-35, 47-65.*

Whitfield Diffie, et al., "New Directions in Cryptography," IEEE Transactions On Information Theory, vol. IT-22, No. 6, Nov. 1976, pp. 29-40.

Whitfield Diffie, "The First Ten Years of Public-Key Cryptography," Proceedings of the IEEE, vol. 76, No. 5, May 1988, pp. 560-577.

Silvio Micali, "Guaranteed Partial Key-Escrow", MIT/LCS/TM-537, Laboratory for Computer Science, Aug. 1995, Handout #13, 14 pages.

Mihir Bellare, et al., "Verifiable Partial Key Escrow," Proceedings of the Fouth Annual Conference on Computer and Communications Security, ACM, 1997 Nov. 1996, pp. 1-22.

U.S. Department of Commerce, National Institute of Standards and Technology, Federal Information Processing Standards Publication 185 Feb. 9, 1994, 8 pages.

Cylink Corporation, "Alternatives to RSA: Using Diffie-Hellman with DSS," 11 pages.

Robert Orfali et al., "The Essential Distributed Objects Survival Guide," 1996, pp. 448-449.

David Chappell, "Understanding Microsoft Windows 2000 Distributed Services," 2000, pp. 319-324.

Robert Orfali et al., "Client/Server Survival Guide Third Edition," 1999, p. 488.

Koblitz, Neal, A Course in Number Theory and Cryptography, 1994, Springer-Verlag New York Inc. 2nd Edition, 8 pages.

U.S. Patent Office, Office Action from U.S. Appl. No. 09/393,411 (cover page and Office Action Summary), filed Nov. 6, 2003, 2 pages.

U.S. Patent Office, Office Action from U.S. Appl. No. 09/393,411 (cover page and Office Action Summary), filed Sep. 8, 2003, 2 pages.

U.S. Patent Office, Office Action from U.S. Appl. No. 09/393,410 (cover page and Office Action Summary), filed Nov. 7, 2003, 2 pages.

U.S. Patent Office, Office Action from U.S. Appl. No. 09/393,410 (cover page and Office Action Summary), filed Sep. 3, 2003, 2 pages.

U.S. Patent Office, Office Action from U.S. Appl. No. 09/608,831 (cover page and Office Action Summary), filed Feb. 9, 2004, 2 pages.

* cited by examiner

OPERATIONAL OPTIMIZATION OF A SHARED SECRET DIFFIE-HELLMAN KEY EXCHANGE AMONG BROADCAST OR MULTICAST GROUPS

RELATED APPLICATION

The present application is a continuation of and claims priority to U.S. patent application Ser. No. 09/393,410, "OPERATIONAL OPTIMIZATION OF A SHARED SECRET DIFFIE-HELLMAN KEY EXCHANGE AMONG BROADCAST OR MULTICAST GROUPS" by Sunil K. Srivastava, which was filed on Sep. 10, 1999, now abandoned, and is incorporated by reference herein. The present application is related to U.S. patent application Ser. No. 09/608,831, "Establishing A Shared Secret Key Over A Broadcast Channel" by Srinath Gundavelli and David McNamee, which was filed on Jun. 30, 2000.

FIELD OF THE INVENTION

The invention relates to cryptographic communication systems, and more specifically, to an optimized key exchange approach for providing secure communication among broadcast or multicast groups in a communications network.

BACKGROUND OF THE INVENTION

The proliferation of network computing has shaped how society transacts business and engages in personal communication. As reliance on computer networks grows, the flow of information between computers continues to increase in dramatic fashion. Accompanying this increased flow of information is a proportionate concern for network security. Commercial users, who regularly conduct business involving the exchange of confidential or company proprietary information over their computer networks, demand that such information is secure against interception by an unauthorized party or corruption. In addition, with the acceptance of such applications as electronic commerce over the global Internet, all users recognize the critical role cryptographic systems play in maintaining the integrity of network communication.

The goal of cryptography is to keep messages secure. A message can be defined as information or data that is arranged or formatted in a particular way. In general, a message, sometimes referred to as "plaintext" or "cleartext", is encrypted or transformed using a cipher to create "ciphertext," which disguises the message in such a way as to hide its substance. In the context of cryptography, a cipher is a mathematical function that can be computed by a data processor. Once received by the intended recipient, the ciphertext is decrypted to convert the ciphertext back into plaintext. Ideally, ciphertext sufficiently disguises a message in such a way that even if the ciphertext is obtained by an unintended recipient, the substance of the message cannot be discerned from the ciphertext.

Many different encryption/decryption approaches for protecting information exist. The selection of an encryption/decryption scheme generally depends upon considerations such as the types of communications to be made more secure, the particular parameters of the network environment in which the security is to be implemented, and the desired level of security. Since the level of security often has a direct effect on system resources, an important consideration is the particular system on which a security scheme is to be implemented.

For example, for small applications that require a relatively low level of security, a traditional restricted algorithm approach may be appropriate. With a restricted algorithm approach, a group of participants agree to use a specific, predetermined algorithm to encrypt and decrypt messages exchanged among the participants. Because the algorithm is maintained in secret, a relatively simple algorithm may be used. However, if secrecy of the algorithm is compromised, the algorithm must be changed to preserve secure communication among the participants. Scalability, under this approach, is problematic; that is, as the number of participants increases, keeping the algorithm secret and updating it when compromises occur place an undue strain on network resources. In addition, standard algorithms cannot be used because each group of participants must have their own unique algorithm.

To address the shortcomings of traditional restricted algorithm approaches, many contemporary cryptography approaches use a key-based algorithm. Basically, two types of key-based algorithms exist: (1) symmetric and (2) asymmetric, such as public key. As a practical matter, a key forms one of the inputs to a mathematical function that a computer or processor uses to generate a ciphertext.

Public key algorithms are designed so that the key used for encryption is different than the key used for decryption. The decryption key cannot be determined from the encryption key, at least not in any reasonable amount of time using reasonable computing resources. Typically, the encryption key (public key) is made public so that anyone, including an eavesdropper, can use the public key to encrypt a message. However, only a specific participant in possession of the decryption key (private key) can decrypt the message.

Public key algorithms, however, are not often employed as a mechanism to encrypt messages largely because such algorithms consume an inordinate amount of system resources and time to encrypt entire messages. Further, public key encryption systems are vulnerable to chosen-plaintext attacks, particularly when there are relatively few possible encrypted messages.

As a result, a public key cryptosystem is utilized to establish a secure data communication channel through key exchanges among the participants. That is, two or more parties, who wish to communicate over a secure channel, exchange or make available to each other public (or non-secure) key values. Each party uses the other party's public key value to privately and securely compute a private key, using an agreed-upon algorithm. The parties then use their derived private keys in a separate encryption algorithm to encrypt messages passed over the data communication channel. Conventionally, these private keys are valid only on a per communication session basis, and thus, are referred to as session keys. These session keys serve to encrypt/decrypt a specified number of messages or for a specified period of time. For instance, in a typical scenario, two users or participants A and B seek to communicate over a secure channel in which user A wants to send a message to B. Thus, user A is considered a publisher of a message to user B, who is acting as a subscriber. The public key algorithm establishes a secure channel between publisher, A, and subscriber, B, as follows:

1. B provides a public key, B, to A.
2. A generates a random session key SK, encrypts it using public key B and
   sends it to B.
3. B decrypts the message using private key, b ( to recover the session key SK).

4. Both A and B use the session key SK to encrypt their communications with each other; each user discards the session key after completing the communication. The above approach provides the added security of destroying the session key at the end of a session, thereby providing greater protection against unauthorized access by eavesdroppers.

A known public key exchange method is the Diffie-Hellman algorithm described in U.S. Pat. No. 4,200,770. The Diffie-Hellman method relies on the difficulty associated with calculating discrete logarithms in a finite field. According to this method, two participants, A and B, each select random large numbers a and b, which are kept secret. A and B also agree (publicly) upon a base number p and a large prime number q, such that p is primitive mod q. A and B exchange the values of p and q over a non-secure channel or publish them in a database that both can access. Then A and B each privately compute public keys A and B, respectively, as follows:

$$A \text{ privately computes a public key A as: } A = p^a \bmod (q) \qquad (1)$$

$$B \text{ privately computes a public key B as: } B = p^b \bmod (q) \qquad (2)$$

A and B then exchange or publish their respective public keys A and B and determine private keys $k_a$ and $k_b$ as follows:

$$A \text{ computes a private key } k_a \text{ as: } k_a = B^a \bmod (q) \qquad (3)$$

$$B \text{ computes a private key } k_b \text{ as: } k_b = A^b \bmod (q) \qquad (4)$$

As evident from equation (3), A's private key is a function of its own private random number, a, and the public key, B. Likewise, equation (4) indicates that B's private key depends on its own private number, b, and the public key of A. As it turns out, A and B arrive at the shared secret key. Substituting for A and B of equations (3) and (4) using equations (1) and (2), respectively yields:

$$k_a = (p^b \bmod (q))^a \bmod (q) \text{ and } k_b = (p^a \bmod (q))^b \bmod (q)$$

$$k_a = p^{ba} \bmod (q) \text{ and } k_b = p^{ab} \bmod (q)$$

Therefore, $k_a = k_b$.

Using the Diffie-Hellman protocol, A and B each possesses the same secure key $k_a$, $k_b$, which can then be used to encrypt messages to each other. An eavesdropper who intercepts an encrypted message can recover it only by knowing the private values, a or b, or by solving an extremely difficult discrete logarithm to yield a or b. Thus, the Diffie-Hellman protocol provides a secure approach for the exchange of keys.

FIG. 6 shows a broadcast version of the Diffie-Hellman method involving three users A, B, and C. The approach is applicable to any number of users, however, three users are shown for clarity and simplicity. Initially, each of the participants A, B, and C randomly generates private integers, a, b, and c, respectively. Thereafter, they compute their public keys, in step 601, as follows:

$$A = p^a \bmod (q) \qquad (5)$$

$$B = p^b \bmod (q) \qquad (6)$$

$$C = p^c \bmod (q) \qquad (7)$$

Next, in step 603, user A sends message C', which equals $C^a$ mod (q), to user B. In turn, B transmits the message, A', which is $A^b$ mod (q), to C, in step 605. User C sends user A, in step 607, the message B', which equals $B^c$ mod (q). Lastly, all the users arrive at a shared secret key, k, by computing the following:

$$A \text{ computes k: } k = B'^a \bmod (q) = p^{abc} \bmod (q) \qquad (8)$$

$$B \text{ computes k: } k = C'^b \bmod (q) = p^{abc} \bmod (q) \qquad (9)$$

$$C \text{ computes k: } k = A'^c \bmod (q) = p^{abc} \bmod (q) \qquad (10)$$

Although the Diffie-Hellman key-exchange algorithm may be used to establish a secure channel in a network environment comprising nodes, the algorithm requires N·(N−1) rounds of point-to-point unicast messages between logically adjacent member nodes. With three nodes, as in this instance, 6 total messages are exchanged as each member node communicates its public key to the other members of the group. As the number of broadcast or multicast group members grows, this method of key-exchange requires extensive message traffic and may introduce appreciable networking delay.

Based upon the foregoing, there is a clear need for improved approaches to key exchange that minimize network processing delays, especially among broadcast or multicast group members in a network.

In particular, there is an acute need for an improved approach to enhance scalability.

Also, there exists a need to utilize a standard public key algorithm to facilitate the ready establishment of secure communication channels across a broad base of users.

Other needs and objects will become apparent from the following description.

Based on the need to provide secure communication while limiting the adverse effects on system resources and the limitations in the prior approaches, an approach for providing secure communication that provides a high level of security while requiring relatively fewer system resources and time to perform is highly desirable.

SUMMARY OF THE INVENTION

According to one aspect of the invention, a method is provided for computing a group shared secret key based upon a public-key algorithm. In an embodiment, a group shared secret key is computed at a first node of a network for use in a public key process and using less than n*(n−1) messages, where "n" is a number of nodes in a broadcast or multicast group of the network. The method may comprise generating an intermediate shared secret key by issuing communications to a second node of the network; sending a first private value associated with the first node to the second node, and receiving from the second node a second private value associated with the second node using the intermediate shared secret key; generating and communicating a collective public key that is based upon the first private value and the second private value to a third node of the network; receiving an individual public key from the third node; and computing and storing the group shared secret key based upon the individual public key.

One feature of this aspect involves joining the first node to an initial multicast group in response to generating the intermediate shared secret key; and joining a second node to a new multicast group that subsumes the initial multicast group after receiving the individual public key. In another feature, the step of communicating the collective public key further comprises determining whether the first node or the second node transfers the collective public key based upon a predetermined metric, for example, an order of entry of such nodes into a multicast group.

According to another feature, sending the first private value and receiving the second private value further comprises computing the first private value as a random integer and receiving a second random integer as the second private value. Another feature involves creating and storing information at the first node that associates the first node, the second node, and the third node as a multicast group communicating over a packet switched network. There may be any number of nodes in a group or in the network.

Communicating the collective public key may comprise storing the collective public key and receiving the collective public key using a key distribution center.

In another feature, generating the shared secret key value comprises computing and storing the shared secret key value "k" at the first node according to the relation $$k=C^{ab} \bmod (q) = p^{abc} \bmod (q)$$

wherein C, a, b, c, q, and p are values stored in a memory, and wherein C is the public key of the third node, a is the private value of the first node, b is the private value of the second node, c is a third private value of the third node, p is a base value, and q is a prime number value.

Using this arrangement, a secure channel in a multicast network environment may be established using only 2n+2 (n−1) messages, which is far less than the number of messages required in prior approaches, e.g., n*(n−1) messages.

According to another aspect of the invention, a method for exchanging cryptographic keys among a plurality of nodes in a multicast or broadcast group comprises computing a first shared secret key between a first entity and a second entity. The first entity includes at least one of the nodes. Similarly, the second entity comprises at least one of the nodes different from the nodes of the first entity. The method further includes transmitting a first public key by the first entity to the second entity in which the first public key is based on the first shared secret key. A second public key that is based on the second shared secret key is transmitted by the second entity to the first entity. The method also comprises computing a first public key based upon the first private key or number and the second private key or number, and transmitting the public key corresponding to the first and second entity to a third entity. The third entity comprises at least one of the nodes, such that these nodes are different from the nodes within the first entity and the second entity. Furthermore, the method includes transmitting a public key of the third entity to the first entity and the second entity and computing a second shared secret key by the first entity and the second entity. The second shared secret key is based upon the third entity public key, the first integer, and the second private key. The third entity computes the second shared secret key based upon the received public key. The method also comprises iteratively performing the above steps until the plurality of nodes reach a group shared secret key. The group shared secret key provides secure communication among the plurality of nodes. This key exchange protocol provides efficient establishment of a secure multicast or broadcast group by reducing the number of message exchanges.

Other features and aspects will become apparent from the following description and the appended claims.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

As will become apparent, an approach for key exchange based upon a public key algorithm, such as the Diffie-Hellman protocol, is optimized to enhance operation in terms of speed of processing as well as scaling of a multicast or broadcast group. Authentication and authorization are orthogonal to exchanging messages in a secret way with a third party. Having third party endorsed key-based signed messages helps tackle the repudiation problem.

The basic public key encryption approach is for a group of participants to publish their public keys, for example, in a database and maintain their own private keys. These participants can access the database to retrieve the public key of the participant to whom they want to send a message and to encrypt a message destined for that participant using the retrieved public key. Unfortunately, the database, even if secure, is vulnerable to key substitution during transmission of the keys. This problem is alleviated by using a trusted intermediary that has the responsibility of distributing the stored public keys to the multicast or broadcast group members. The trusted intermediary is a third party, trusted authentication authority. When Kerberos key exchange is used for authentication, the trusted intermediary may be implemented as a Key Distribution Center (KDC). When public key infrastructure is used, the trusted intermediary may be a Certificate Authority (CA).

The KDC or other trusted intermediary distributes the stored public keys to the multicast or broadcast group members by encrypting the public keys with its own private key, which is shared with each of the group members. The group members then decipher the encrypted message to determine each others' public keys.

Figure 1:
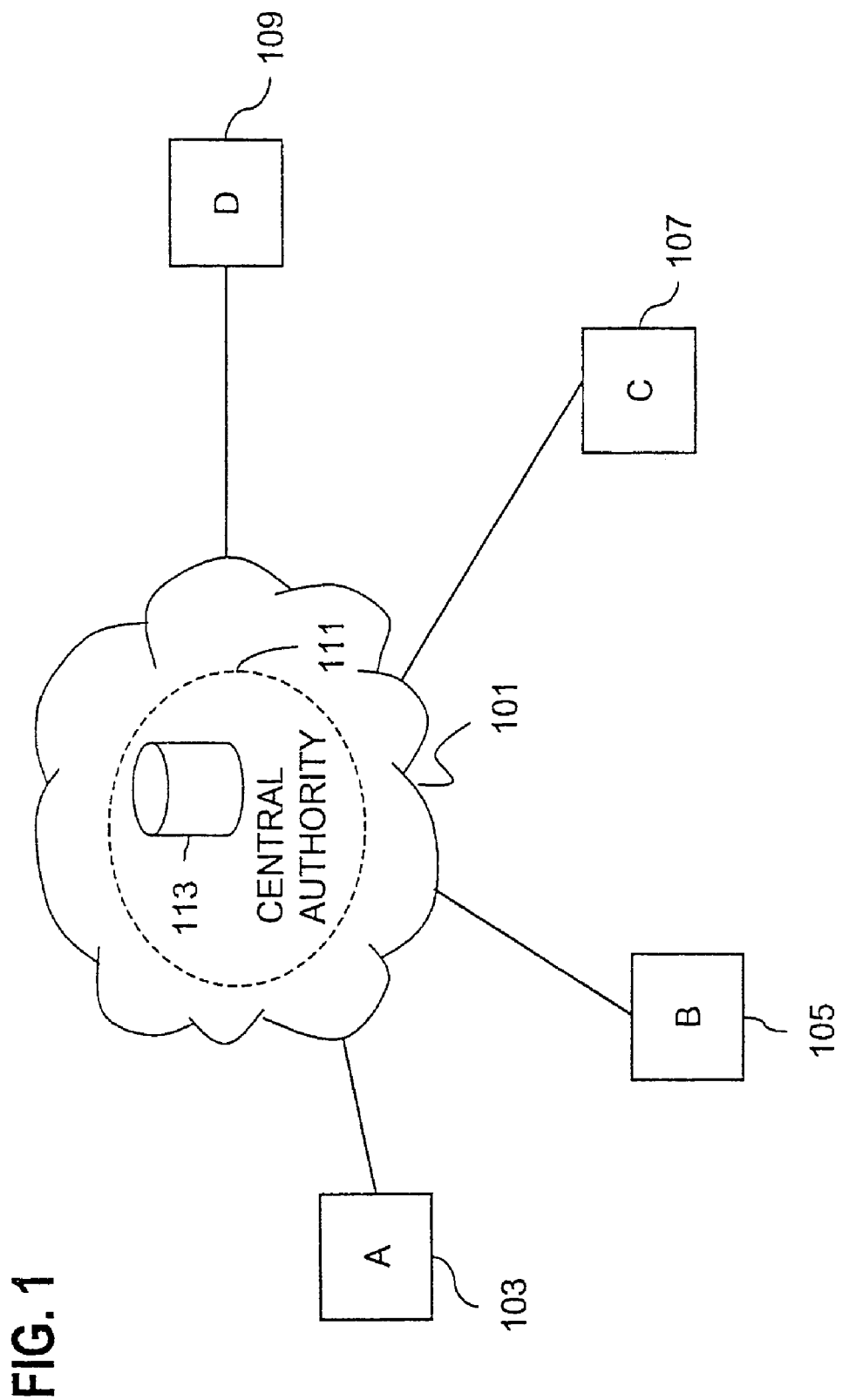
FIG. 1 is a block diagram of a secure communication system employing a central authority in the form of a key distribution center (KDC).

FIG. 1 shows an exemplary implementation with four users A, B, C, and D connected via network 101. The network 101 may be a packet switched network, which supports the Internet Protocol (IP). A Central Authority 111, which is a third party trusted authentication authority, is hosted in network 101. In a preferred embodiment, Central Authority 111 is a multicast subnetwork made up of multiple KDCs interconnected over secured channels in a hierarchical relationship. Among other functions, the Central Authority 111 provides authentication and validation services when individual nodes join the multicast or broadcast group. Although four (4) users A, B, C, D are shown as an example, any number of users or nodes can be used.

Central Authority 111 may be a KDC subnetwork in an environment that uses an exchange of Kerberos credentials for communications security. However, any other suitable central authority mechanism may be substituted. For example, a certificate authority (CA) may be used as Central Authority 111 when a public key infrastructure (PKI) is used for communications security in the network.

In an exemplary embodiment, a distributed directory provides the services of the KDC. The directory may be an X.400 directory or an LDAP-compatible directory. In general, directory technology creates active associations among the users, applications, and the network. A directory is a logically centralized, highly distributed data repository accessible by the applications. The distributed architecture is achieved by replicating data across multiple directory servers strategically located throughout the network. Directories can represent network elements, services, and policies to enable ease of network administration and security. In particular, a directory can supply authentication services, whereby all users, applications, and network devices can authenticate themselves through a common scheme. One type of directory within contemplation of the present invention is Microsoft Active Directory.

In the system of FIG. 1, the directory, which is a port of the Central Authority 111, may contain user account or security principal information for authenticating users or services along with the shared secret key between the members A, B, C, and D and the directory. Such information is stored in a database 113, which can reside within each KDC or shared among two or more KDCs. Users A, B, C, and D authenticate themselves using the security services of the directory. Further, the directory can serve as a certificate authority (CA), or work cooperatively with CAs. In should be noted that the secured channels within the Central Authority 111 can be established using the key exchange method of the present invention, which is discussed below with respect to FIG. 3 and FIG. 4.

According to an alternative embodiment, a centralized KDC approach may be utilized whereby the Central Authority 111 comprises a single KDC that serves each of the workstations 103, 105, 107, 109 of users A, B, C, and D, respectively. In the centralized case, the KDC utilizes point-to-point communication with each group member to authenticate all the members. Central Authority 111 possesses a database 113 for storing the public key values of all the participants.

Figure 2:
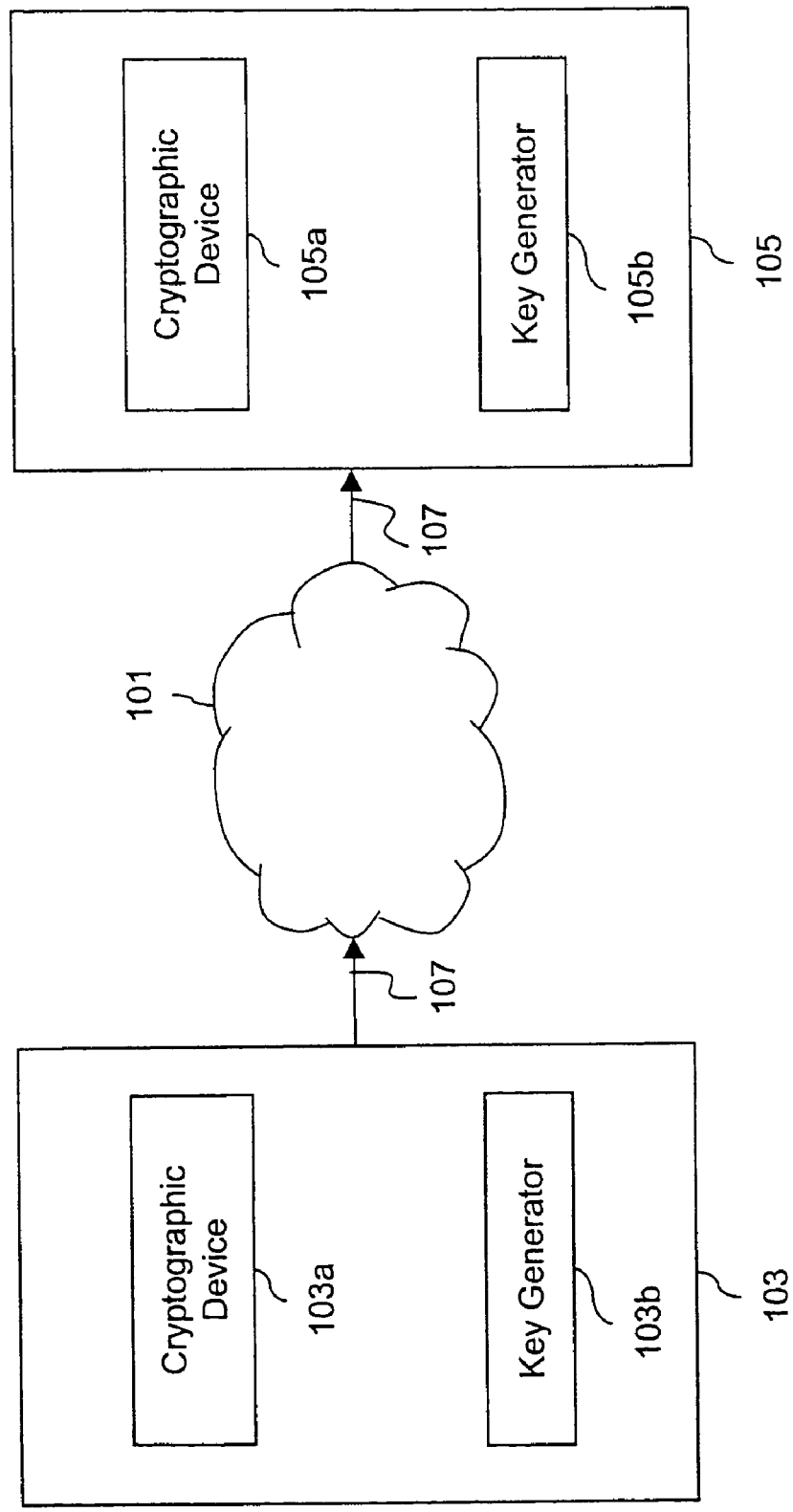
FIG. 2 is a block diagram illustrating the security mechanisms for providing secure communication between two participants in the system of FIG. 1.

FIG. 2 illustrates a secured communication system 201 that a mechanism for two participants A and B to arrive at a shared secret key value, according to an embodiment of the present invention. Two participants are shown as an example, however, any number of users, clients, or nodes may be used. User A employing workstation 103 communicates with another workstation 105 of user B over a communication link 107. Link 107 is established over network 101. Network 101 may be a local area network (LAN), a wide area network (WAN), the global packet-switched network known as the Internet, a wireless transmission medium, or any other medium for exchanging information between the participants. In addition, link 107 may be non-secure, thereby allowing third party access to information transmitted by the link 107, or alternatively, link 107 may be secure.

As seen in FIG. 2, workstations 103, 105 have components with complementary functions. Workstation 103 (user A) includes a key generator 103*b* and a cryptographic device 103*a*. Key generator 103*b* generates public and private keys used for encrypting and decrypting information exchanged with workstation 105 (user B). Cryptographic device 103*a* encrypts and decrypts information exchanged with workstation 105 using private and public keys generated by key generator 103*b*. Similarly, workstation 105 includes a key generator 105*b* and a cryptographic device 105*a*. Key generator 105*b* supplies public and private keys that are used to establish a secured link 107 with workstation 103. Information that are exchanged with workstation 103 are encrypted and decrypted by cryptographic device 105*a* using private and public keys generated by key generator 105*b*.

Participants 103, 105, according to an embodiment use the Diffie-Hellman method to exchange their keys. Using this approach, these participants 103 and 105 can securely exchange information over link 107 using a public key exchange protocol.

Figure 3:
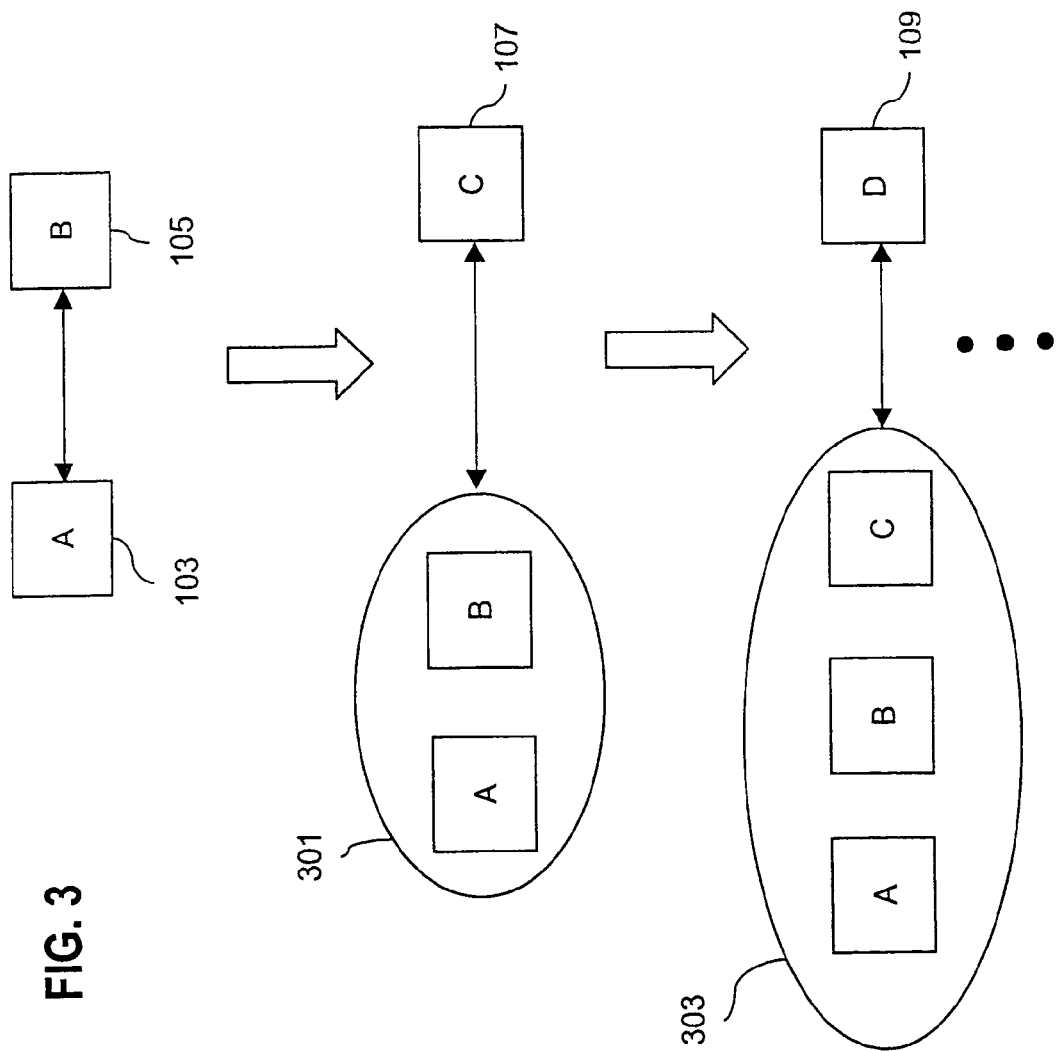
FIG. 3 is a diagram of the operation of a key exchange method.

As the number of participants in a multicast or broadcast group increases beyond two, the standard broadcast version of Diffie-Hellman begins to introduce greater delays in establishing the secured channel. As shown in FIG. 3, a public key exchange protocol, which in the preferred embodiment is based mathematically on the Diffie-Hellman method discussed above, addresses two nodes at a time. In this example, a multicast group comprises users A, B, and C of the network of FIG. 1. Initially, users A, B via their respective workstations 103, 105 establish a shared secret key to securely communicate between themselves. Conceptually, users A, B form a single entity 301. That is, a subsequent user or node seeking to join the multicast group effectively views the previously formed multicast group as a single unit. Hence, users A and B are treated as a single entity with respect to formulating a new shared secret key with a new group member.

Consequently, only one user, A or B, needs to communicate with the new multicast group member, user C. In the preferred embodiment, the user who last joins the multicast group is designated as the node that relays the group's information to the new user. The current multicast group, entity 301, has only two users A and B because B can be considered as joining with A, user B is the designated node. Alternatively, the designated node can be determined according to physical proximity or other metrics (e.g., telecommunication cost, reliability, link utilization, etc.) with respect to the new node.

Once entity 301 and user C arrive at a new shared secret key, they form a new entity 303, constituting a new multicast group that subsumes the previously formed multicast group 301. If user D wishes to join the multicast group, only one of the users among A, B, and C needs to share the group's public value ("collective key"). Because user C was the last member to join, it forwards the group's public value to user D, who may then compute the new shared secret key based on the collective key. This "binary" approach of coming to a shared secret key between two entities at a time, as further described with respect to FIG. 4, advantageously results in a reduced number of messages exchanged among the group members over the standard broadcast Diffie-Hellman approach.

Figure 4:
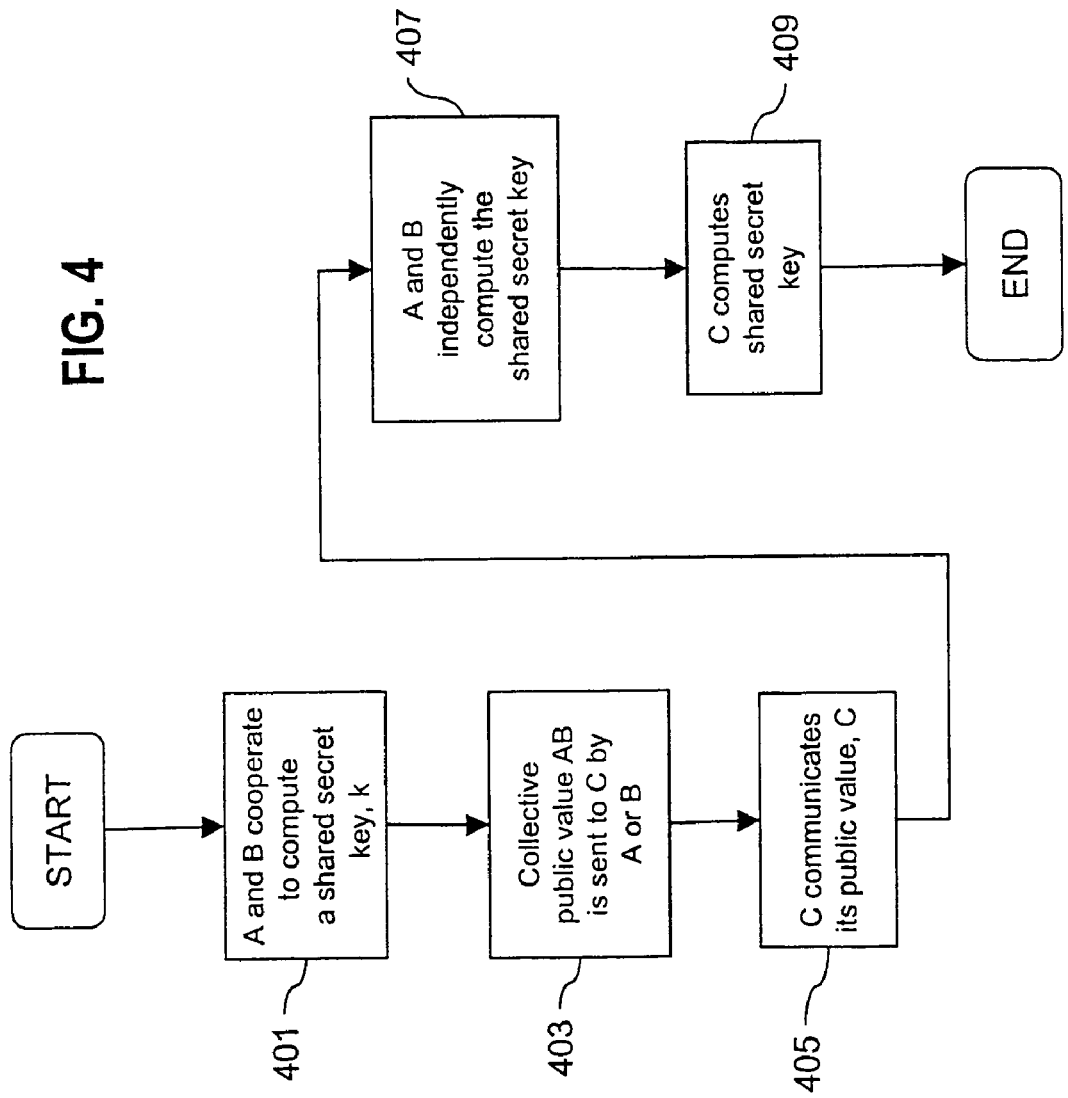
FIG. 4 is a flow chart illustrating a method for key exchange.

In FIG. 4, a flow chart shows the steps users A, B, and C perform to compute a shared secret key.

In step 401, A and B cooperate to compute a shared secret key, $k=p^{ab}$ mod (q), thereby forming a first multicast entity 301. Once A and B have reached the shared secret key, they exchange their private messages or numbers, a and b. Private numbers a and b may be randomly generated integers. A separate and different permanent private key may be used to sign a message for the purposes of ensuring authenticity and preventing repudiation attacks, by signing the message using a key that is endorsed by a third party CA or KDC.

Next, as shown by step 403, a joint or shared public value (public key) AB, which is determined by users A and B, is sent to user C by either A or B. As earlier discussed, in the preferred embodiment, the last member to join the group is charged with this responsibility. Thus, in this example, user B transmits AB to C. Accordingly, when user C joins the multicast group, C has knowledge of only one entity. That entity may be a single node or multiple nodes; in this case, A and B are considered one entity. AB may be determined according to the relation $$AB = k_{ab}{}^{ab} \bmod (q) = p^{(ab)(ab)} \bmod (q) \tag{11}$$

Equation (11) indicates that the private number of the formed entity or multicast group AB is the product of the individual private numbers a and b, raised to a power that is a function of the number of nodes within the formed entity. Thus, the private value of AB is $(ab)^2$.

In step 405, the new node of user C communicates its public value, $C=p^c$ mod (q), to the multicast group, for example, users A and B. As shown by step 407, after receiving C's public value, A and B independently compute the shared secret key value "k" as follows:

$$k = C^{ab} \bmod (q) = p^{abc} \bmod (q) \tag{12}$$

Users A and B are able to compute the shared secret key because they know each other's randomly generated private numbers, a and b.

Then, in step 409, user C computes the shared secret key based on the following:

$$k = (AB)^c \bmod (q) = p^{abc} \bmod (q) \tag{13}$$

Accordingly, establishing a secure channel in a multicast network environment advantageously requires only 2n+2 (n−1) messages, where n is the round of iteration of exchanging messages between two entities. Noting that 2 nodes are combined in the first round and 3 nodes in the second round, the following expression results:

$$2(N-1) + 2(N-1-1) = 4N-6 \text{ messages},$$

where N is the number of nodes in the multicast or broadcast group. While the standard broadcast version of Diffie-Hellman requires N(N−1) or $N^2+N$ messages and grows exponentially with an increase in the number of nodes, the present invention follows a linear progression. Operationally, embodiments of the invention are more efficient, and yet, provide the same level of security.

The foregoing processes have been illustrated using an example involving only three users A, B, and C, however, the approach described herein is applicable to any number of users or nodes.

In the preferred embodiment, the processes shown in FIG. 3 and FIG. 4 may be implemented as one or more computer-executed instructions, processes, programs, subroutines, functions, or their equivalents. In an embodiment, each workstation 103, 105, 107, and 109 is a general-purpose computer of the type shown in FIG. 5 and described herein in connection with FIG. 3 and FIG. 4. The cryptographic devices 103a, 105a and the key generators 103b, 105b are one or more computer-executed instructions, processes, programs, subroutines, functions, or their equivalents. Further, embodiments may be implemented as discrete hardware circuitry, a plurality of computer instructions (computer software), or a combination of discrete hardware circuitry and computer instructions.

Figure 5:
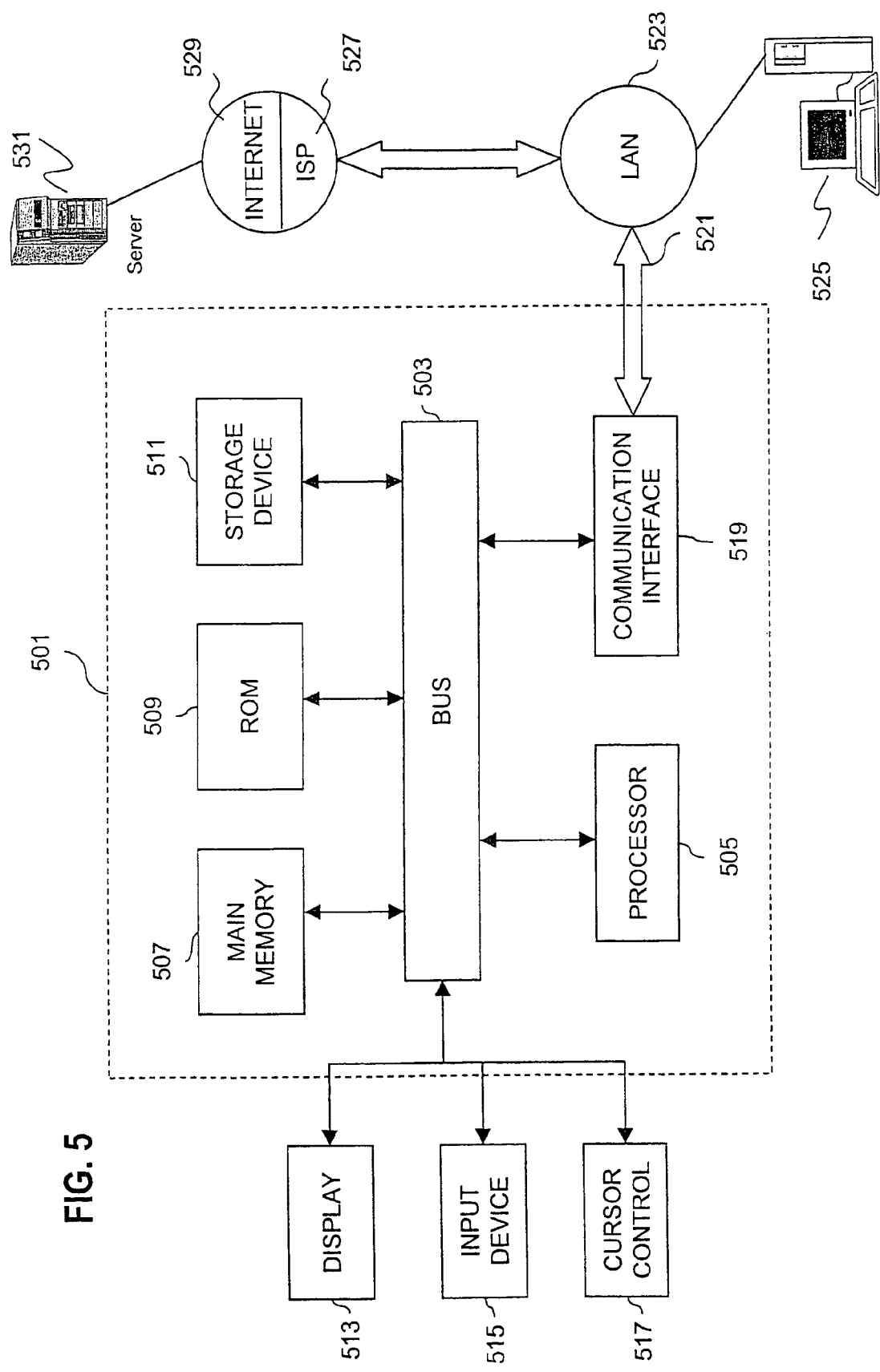
FIG. 5 is a block diagram of a computer system on which embodiments may be implemented.
Figure 6:
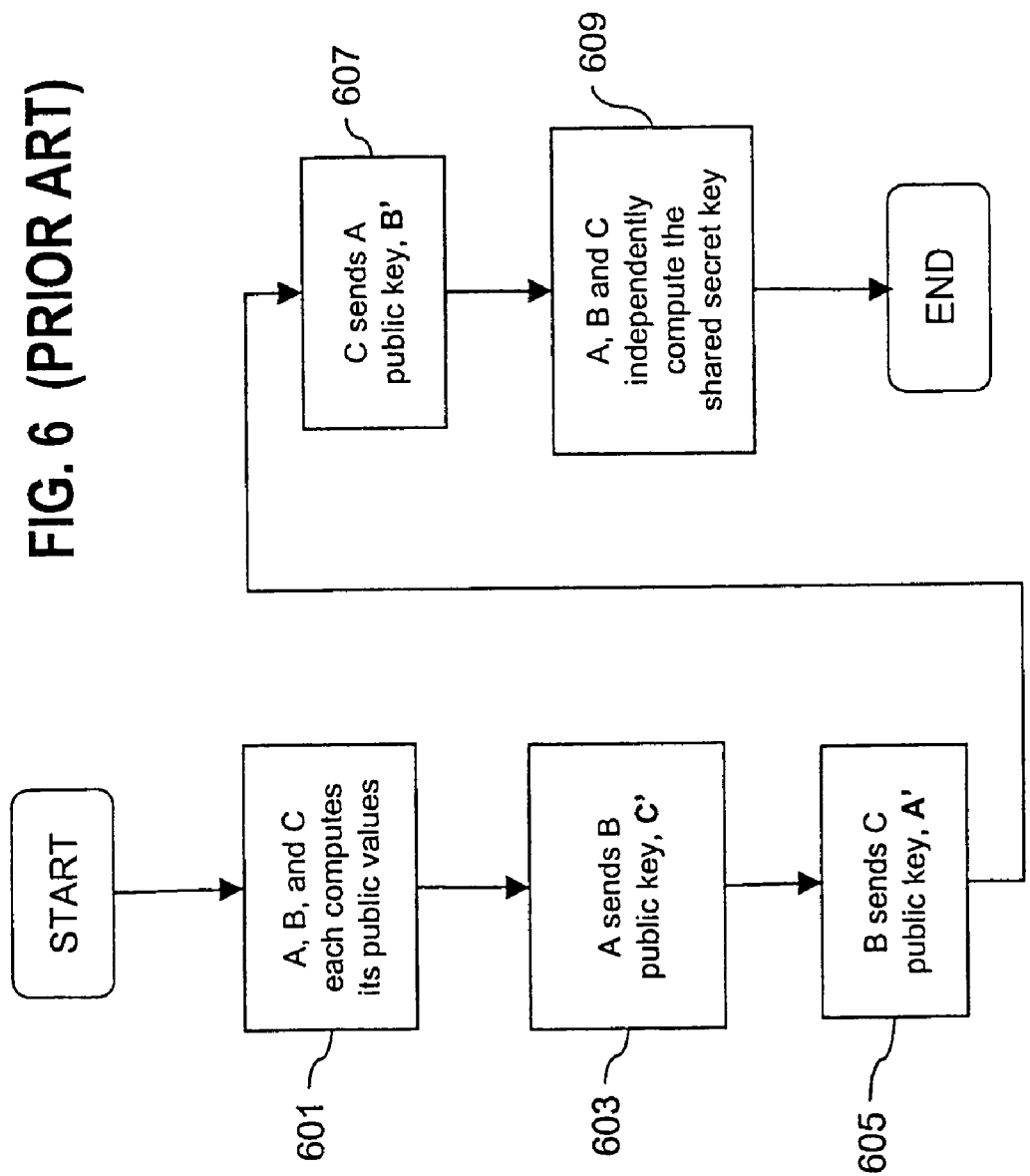
FIG. 6 is a flow chart showing a conventional broadcast Diffie-Hellman method of key exchange.

FIG. 5 illustrates a computer system 501 upon which an embodiment according to the present invention may be implemented. Computer system 501 includes a bus 503 or other communication mechanism for communicating information, and a processor 505 coupled with bus 503 for processing the information. Computer system 501 also includes a main memory 507, such as a random access memory (RAM) or other dynamic storage device, coupled to bus 503 for storing information and instructions to be executed by processor 505. In addition, main memory 507 may be used for storing temporary variables or other intermediate information during execution of instructions to be executed by processor 505. Computer system 501 further includes a read only memory (ROM) 509 or other static storage device coupled to bus 503 for storing static information and instructions for processor 505. A storage device 511, such as a magnetic disk or optical disk, is provided and coupled to bus 503 for storing information and instructions.

Computer system 501 may be coupled via bus 503 to a display 513, such as a cathode ray tube (CRT), for displaying information to a computer user. An input device 515, including alphanumeric and other keys, is coupled to bus 503 for communicating information and command selections to processor 505. Another type of user input device is cursor control 517, such as a mouse, a trackball, or cursor direction keys for communicating direction information and command selections to processor 505 and for controlling cursor movement on display 513.

Embodiments are related to the use of computer system 501 to implement a public key exchange encryption approach for securely exchanging data between participants. According to one embodiment, the public key exchange encryption approach is provided by computer system 501 in response to processor 505 executing one or more sequences of one or more instructions contained in main memory 507. Such instructions may be read into main memory 507 from another computer-readable medium, such as storage device 511. Execution of the sequences of instructions contained in main memory 507 causes processor 505 to perform the process steps described herein. One or more processors in a multi-processing arrangement may also be employed to execute the sequences of instructions contained in main memory 507. In alternative embodiments, hard-wired circuitry may be used in place of or in combination with software instructions. Thus, embodiments are not limited to any specific combination of hardware circuitry and software.

Further, the key exchange protocol may reside on a computer-readable medium. The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 511. Volatile media includes dynamic memory, such as main memory 507. Transmission media includes coaxial cables, copper wire and fiber optics, including the wires that comprise bus 503. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions relating to computation of a public key into its dynamic memory and send the instructions over a telephone line using a modem. A modem local to computer system 501 can receive the data on the telephone line and use an infrared transmitter to convert the data to an infrared signal. An infrared detector coupled to bus 503 can receive the data carried in the infrared signal and place the data on bus 503. Bus 503 carries the data to main memory 507, from which processor 505 retrieves and executes the instructions. The instructions received by main memory 507 may optionally be stored on storage device 511 either before or after execution by processor 505.

Computer system 501 also includes a communication interface 519 coupled to bus 503. Communication interface 519 provides a two-way data communication coupling to a network link 521 that is connected to a local network 523. For example, communication interface 519 may be a network interface card to attach to any packet switched local area network (LAN). As another example, communication interface 519 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 519 sends and receives electrical, electromagnetic or optical signals that carry digital data streams representing various types of information.

Network link 521 typically provides data communication through one or more networks to other data devices. For example, network link 521 may provide a connection through local network 523 to a host computer 525 or to data equipment operated by an Internet Service Provider (ISP) 527. ISP 527 in turn provides data communication services through the Internet 529. Local network 523 and Internet 529 both use electrical, electromagnetic or optical signals that carry digital data streams. The signals through the various networks and the signals on network link 521 and through communication interface 519, which carry the digital data to and from computer system 501, are exemplary forms of carrier waves transporting the information.

Computer system 501 can send encrypted messages and receive data, including program code, through the network(s), network link 521 and communication interface 519. In the Internet example, a server 531 might transmit a requested code for an application program through Internet 529, ISP 527, local network 523 and communication interface 519. One such downloaded application provides a public key exchange encryption approach for securely exchanging data between participants as described herein.

The received code may be executed by processor 505 as it is received, and/or stored in storage device 511, or other non-volatile storage for later execution. In this manner, computer system 501 may obtain application code in the form of a carrier wave.

The techniques described herein provide several advantages over prior public key exchange encryption approaches for securely exchanging data among multiple participants. Because the number of messages required for the key exchange is reduced, network latency correspondingly decreases. Further, the multicast or broadcast group exhibits improved scalability.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for computing a group shared secret key at a first node of a network for use in a public key process and using less than $n*(n-1)$ messages, where "n" is a number of nodes in a broadcast or multicast group of the network, the method comprising the computer-implemented steps of:
   generating an intermediate shared secret key by issuing communications to a second node of the network;
   sending a first private value associated with the first node to the second node, and receiving from the second node a second private value associated with the second node using the intermediate shared secret key;
   generating and communicating a collective public key that is based upon the first private value and the second private value to a third node of the network;
   receiving an individual public key from the third node; and
   computing and storing the group shared secret key based upon the individual public key.

2. The method as recited in claim 1, further comprising:
   joining the first node to an initial multicast group in response to generating the intermediate shared secret key; and
   joining a second node to a new multicast group that subsumes the initial multicast group after receiving the individual public key.

3. The method as recited in claim 1, wherein the public-key process is Diffie-Hellman key exchange.

4. The method as recited in claim 1, wherein the step of communicating the collective public key further comprises determining whether the first node or the second node transfers the collective public key based upon an order of entry of such nodes into a multicast group.

5. The method as recited in claim 1, wherein the step of communicating the collective public key further comprises determining whether the first node or the second node transfers the collective public key based upon a predetermined metric.

6. The method as recited in claim 1, wherein sending the first private value and receiving the second private value further comprises computing the first private value as a random integer and receiving a second random integer as the second private value.

7. The method as recited in claim 1, further comprising creating and storing information at the first node that associates the first node, the second node, and the third node as a multicast group communicating over a packet switched network.

8. The method as recited in claim 1, wherein the steps of generating, sending, communicating, and receiving further comprise communicating no more than $2n+2(n-1)$ total messages.

9. The method as recited in claim 1, wherein the step of communicating the collective public key comprises storing the collective public key and receiving the collective public key using a key distribution center.

10. The method as recited in claim 1, further comprising the step of establishing a cryptographic communication session between the first node and the second node, wherein secure communications are established between the first and the second node using public key exchange and no more than 2n+2(n−1) total messages.

11. A method as recited in claim 1, wherein generating the shared secret key value comprises computing and storing the shared secret key value "k" at the first node according to the relation $k=C^{ab} \bmod (q) = p^{abc} \bmod (q)$ wherein C, a, b, c, q, and p are values stored in a memory, and wherein C is the individual public key, a is the private value of the first node, b is the private value of the second node, c is a third private value of the third node, p is a base value, and q is a prime number value.

12. A method for exchanging cryptographic keys among a plurality of nodes in a multicast or broadcast group, where "n" is a number of nodes in the multicast or broadcast group, the method comprising the computer-implemented steps of:
 (a) computing and storing a first shared secret key at a first node;
 (b) transmitting a first message, encrypted using the first shared secret key, to a second node;
 (c) receiving a second message, encrypted using the first shared secret key, from the second node;
 (d) computing and storing a first public key based upon the first and second messages;
 (e) transmitting the first public key to a third node;
 (f) receiving a second public key from the third node;
 (g) computing a second shared secret key based upon the second public key, the first message, and the second message;
 (h) iteratively performing steps of (e) through (g) until the nodes reach a group shared secret key for use in cryptographic communication among the of nodes, and using less than n*(n−1) total messages; wherein the first node and second node independently come to a shared secret key value.

13. The method as recited in claim 12, further comprising:
 joining the first node to an initial multicast group in response to generating the first public key; and
 joining the first node to a new multicast group that subsumes the initial multicast group after receiving the second public key.

14. The method as recited in claim 12, wherein the step of transmitting the first public key further comprises determining whether the first node or the second node transfers the first public key based upon an order of entry of such nodes into a multicast group.

15. The method as recited in claim 12, further comprising creating and storing information at the first node that associates the first node, the second node, and the third node as a multicast group communicating over a packet switched network.

16. The method as recited in claim 12, wherein step (h) comprises the step of:
 (h) iteratively performing steps of (e) through (g) until the nodes reach a group shared secret key for use in cryptographic communication among the of nodes, and using no more than 2n+2(n−1) total messages.

17. The method as recited in claim 12, further comprising communicating with a key distribution center to obtain public keys for use in arriving at a shared secret value.

18. The method as recited in claim 12, further comprising the step of establishing a cryptographic communication session between the nodes, wherein secure communications are established between the nodes using public key exchange and no more than 2n+2(n−1) total messages.

19. A method as recited in claim 12, wherein generating the shared secret key value comprises computing and storing the first shared secret key value "k" at the first node according to the relation $k=C^{ab} \bmod (q) = p^{abc} \bmod (q)$ wherein C, a, b, c, q, and p are values stored in a memory, and wherein C is the individual public key, a is the private value of the first node, b is the private value of the second node, c is a third private value of the third node, p is a base value, and q is a prime number value.

20. A computer-readable medium carrying one or more sequences of one or more instructions for computing a group shared secret key at a first node of a network for use in a public key process and using less than n*(n−1) messages, where "n" is a number of nodes in a broadcast or multicast group of the network, and which instructions, when executed by one or more processors, cause the one or more processors to perform the steps of:
 generating an intermediate shared secret key by issuing communications to a second node of the network;
 sending a first private value associated with the first node to the second node, and
  receiving from the second node a second private value associated with the second node using the intermediate shared secret key;
 generating and communicating a collective public key that is based upon the first private value and the second private value to a third node of the network;
 receiving an individual public key from the third node; and
 computing and storing the group shared secret key based upon the individual public key.

21. The computer-readable medium recited in claim 20, wherein the instructions further cause the one or more processors to carry out the steps of:
 joining the first node to an initial multicast group in response to generating the intermediate shared secret key; and
 joining the first node to a new multicast group that subsumes the initial multicast group after receiving the individual public key.

22. The computer-readable medium as recited in claim 20, wherein the public-key process is Diffie-Hellman key exchange.

23. The computer-readable medium as recited in claim 20, wherein the instructions for communicating the collective public key further comprise instructions for determining whether the first node or the second node transfers the collective public key based upon an order of entry of such nodes into a multicast group.

24. The computer-readable medium as recited in claim 20, wherein the instructions for communicating the collective public key further comprise instructions for determining whether the first node or the second node transfers the collective public key based upon a predetermined metric.

25. The computer-readable medium as recited in claim 20, wherein the instructions for sending the first private value and receiving the second private value further comprise instructions for computing the first private value as a random integer and receiving a second random integer as the second private value.

26. The computer-readable medium as recited in claim 20, further comprising instructions for creating and storing information at the first node that associates the first node, the second node, and the third node as a multicast group communicating over a packet switched network.

27. The computer-readable medium as recited in claim 20, wherein the instructions for generating, sending, communicating, and receiving further comprise instructions that communicate no more than 2n+2(n−1) total messages.

28. The computer-readable medium as recited in claim 20, wherein the instructions for communicating the collective public key further comprise instructions for storing the collective public key and receiving the collective public key using a key distribution center.

29. The computer-readable medium as recited in claim 20, further comprising instructions for establishing a cryptographic communication session between the first node and the second node, wherein secure communications are established between the first and the second node using public key exchange and no more than 2n+2(n−1) total messages.

30. A computer-readable medium as recited in claim 20, wherein the instructions for generating the shared secret key value further comprise instructions for computing and storing the shared secret key value "k" at the first node according to the relation $$k = C^{ab} \bmod (q) = p^{abc} \bmod (q)$$

wherein C, a, b, c, q, and p are values stored in a memory, and wherein C is the individual public key, a is the private value of the first node, b is the private value of the second node, c is a third private value of the third node, p is a base value, and q is a prime number value.

* * * * *